(12) United States Patent
Hu et al.

(10) Patent No.: US 11,750,268 B2
(45) Date of Patent: Sep. 5, 2023

(54) SYSTEMS, METHODS, AND APPARATUS FOR INACTIVE STATE BEAM FAILURE RECOVERY

(71) Applicant: Samsung Electronics Co., Ltd., Suwon-si (KR)

(72) Inventors: Liang Hu, San Diego, CA (US); Jung Hyun Bae, San Diego, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 17/386,524

(22) Filed: Jul. 27, 2021

(65) Prior Publication Data
US 2022/0045736 A1 Feb. 10, 2022

Related U.S. Application Data

(60) Provisional application No. 63/075,812, filed on Sep. 8, 2020, provisional application No. 63/061,779, filed on Aug. 5, 2020.

(51) Int. Cl.
H04W 56/00 (2009.01)
H04W 74/00 (2009.01)
(Continued)

(52) U.S. Cl.
CPC ........... *H04B 7/088* (2013.01); *H04L 1/1896* (2013.01); *H04W 56/001* (2013.01);
(Continued)

(58) Field of Classification Search
CPC ...... H04B 7/088; H04B 7/0695; H04B 1/745; H04B 7/0408; H04B 7/0617;
(Continued)

(56) References Cited

U.S. PATENT DOCUMENTS 10,779,171 B2  9/2020  Yu et al.
2018/0219606 A1  8/2018  Ng et al.
(Continued)

FOREIGN PATENT DOCUMENTS

WO  2019100972 A1  5/2019

OTHER PUBLICATIONS

European Partial Search Report for Application No. 21189430.8, dated Jan. 7, 2022.
(Continued)

*Primary Examiner* — Harry H Kim
(74) *Attorney, Agent, or Firm* — Renaissance IP Law Group LLP

(57) ABSTRACT

A method for beam failure recovery in a communication network may include detecting a beam failure based on a downlink transmission at a user equipment (UE) in an inactive state, and performing a beam failure recovery (BFR) procedure at the UE in the inactive state based on detecting the beam failure. The downlink transmission may include a reference signal. The reference signal may include a synchronization signal block, The reference signal may include a channel state information reference signal. Detecting the beam failure may include detecting the beam failure based on a beam failure measurement configuration. The method may further include receiving the beam failure measurement configuration at the UE. The UE may receive the beam failure measurement configuration based on a preconfigured uplink resources (PUR) response. The UE may receive the beam failure measurement configuration based on a system information block (SIB) transmission.

17 Claims, 9 Drawing Sheets

(51) Int. Cl.
   *H04W 74/08*    (2009.01)
   *H04W 76/19*    (2018.01)
   *H04J 11/00*    (2006.01)
   *H04B 7/06*     (2006.01)
   *H04B 1/74*     (2006.01)
   *H04W 24/04*    (2009.01)
   *H04B 7/08*     (2006.01)
   *H04L 1/1867*   (2023.01)
   *H04W 72/0446*  (2023.01)
   *H04W 72/21*    (2023.01)
   *H04W 72/54*    (2023.01)

(52) U.S. Cl.
   CPC ....... *H04W 72/0446* (2013.01); *H04W 72/21* (2023.01); *H04W 72/54* (2023.01); *H04W 74/006* (2013.01); *H04W 74/0841* (2013.01); *H04W 76/19* (2018.02)

(58) Field of Classification Search
   CPC .. H04L 1/1896; H04L 5/0048; H04W 56/001; H04W 72/0413; H04W 72/0446; H04W 72/1226; H04W 74/006; H04W 74/0841; H04W 76/19; H04W 16/28; H04W 24/04; H04W 72/046; H04W 72/1278; H04W 74/008; H04W 76/18; H04W 76/27; H04W 48/10; H04W 72/042; H04W 74/004; H04J 11/0069; H04J 11/0073; H04J 11/0076

See application file for complete search history.

(56) References Cited

U.S. PATENT DOCUMENTS

| | | |
|---|---|---|
| 2018/0302889 A1 | 10/2018 | Guo et al. |
| 2019/0037498 A1 | 1/2019 | Tseng et al. |
| 2019/0261195 A1 | 8/2019 | Cheng et al. |
| 2019/0342907 A1* | 11/2019 | Huang .................. H04L 5/0048 |
| 2020/0137821 A1* | 4/2020 | Cirik .................... H04W 76/19 |
| 2020/0170020 A1* | 5/2020 | Agiwal ................ H04W 24/08 |
| 2020/0373991 A1* | 11/2020 | Zhou .................... H04W 76/19 |
| 2021/0037530 A1 | 2/2021 | Shih et al. |
| 2021/0329577 A1* | 10/2021 | Jiang .................... H04L 5/0094 |
| 2021/0392035 A1* | 12/2021 | Jiang .................... H04B 7/0695 |
| 2022/0006690 A1* | 1/2022 | Matsumura ......... H04L 41/0672 |
| 2022/0022247 A1* | 1/2022 | Agiwal ............. H04W 72/0453 |
| 2022/0046661 A1* | 2/2022 | Jeon ...................... H04W 72/23 |

OTHER PUBLICATIONS

European Extended Search Report for Application No. 21189430.8, dated Mar. 24, 2022.

European Office Action for Application No. 21189430.8, dated Apr. 12, 2023.

\* cited by examiner

SYSTEMS, METHODS, AND APPARATUS FOR INACTIVE STATE BEAM FAILURE RECOVERY

CROSS-REFERENCE TO RELATED APPLICATION

This application claims priority to, and the benefit of, U.S. Provisional Patent Application Ser. No. 63/061,779 titled "Beam Failure Recovery and Reconfiguration In RRC_Inactive State" filed Aug. 5, 2020 and U.S. Provisional Patent Application Ser. No. 63/075,812 titled "Beam Failure Recovery and Reconfiguration In RRC_inactive State" filed Sep. 8, 2020, both of which are incorporated by reference.

TECHNICAL AREA

This disclosure relates generally to communication systems, and specifically to systems, methods, and apparatus for beam failure recovery and/or reconfiguration in an inactive state.

BACKGROUND

Wireless communication networks may use beamforming techniques to Improve data transmission between devices such as a base station and a user equipment (UE). Beams between devices, however, may experience failures for various reasons such as a blockage caused by a person walking between the devices, Beam failure recovery (BFR) techniques may be used to restore data transmission between devices that experience a beam failure. A downlink beam failure may be detected by a base station which may then initiate a recovery procedure in which a new beam may be selected for data transmission.

The above information disclosed in this Background section is only for enhancement of understanding of the background of the invention and therefore it may contain information that does not constitute prior art.

SUMMARY

A method for beam failure recovery in a communication network may include detecting a beam failure based on a downlink transmission at a user equipment (UE) in an inactive state, and performing a beam failure recovery (BFR) procedure at the UE in the inactive state based on detecting the beam failure. The downlink transmission may include a reference signal. The reference signal may include a synchronization signal block. The reference signal may include a channel state information reference signal. Detecting the beam failure may include detecting the beam failure based on a beam failure measurement configuration. The method may further include receiving the beam failure measurement configuration at the UE. The UE may receive the beam failure measurement configuration based on a preconfigured uplink resources (PUP) response. The UE may receive the beam failure measurement configuration based on a system information block (SIB) transmission. The UE may be preconfigured with at least a portion of the beam failure measurement configuration in a connected state. Detecting the beam failure may include switching one or more beams based on the beam failure measurement configuration, and measuring the one or more beams based on the beam failure measurement configuration.

A first active one of two or more spatial relation informations for a preconfigured uplink resources (PUR) physical uplink shared channel (PUSCH) may be quasi-colocated (QCLed) with a first one of two or more synchronization signal block (SSB) indexes that may be QCLed with one or more downlink channels for a PUR response message, the two or more spatial relation informations QCLed with the two or more SSB indexes are preconfigured, and detecting a beam failure may further include activating, by a medium access control (MAC) control element (CE), a second one of the two or more spatial relations based on a base station determining the second one of the two or more spatial relations. The UE may perform one or more measurements of a physical downlink control channel (PDCCH) that schedules a physical downlink shared channel (PDSCH) carrying the PUR response message corresponding to one or more of the SSB two or more SSB indexes, and report the one or more measurements to the base station. The base station may determine the second one of the two or more spatial relations based on the one or more measurements, and activate the second one of the two or more spatial relations by the MAC CE in a PDSCH, and detecting a beam failure may further include updating the PDCCH and the PDSCH to a transmission control indicator (TCI) state QCLed with an SSB index corresponding to the second one of the two or more spatial relations. A first TCI state of a PDSCH reception for a PUR occasion may be QCLed with a default TCI state of a PDCCH reception for a PUR response for a PUR occasion based on a delay between the PDSCH reception and the PDCCH reception. The UE may monitor one or more control resource sets (CORESETs) in a slot, and the default TCI state of the PDCCH reception may include a first one of the one or more CORESETs corresponding to an SSB index. The default TCI state of the PDCCH reception may include an SSB index QCLed with PUP. A first TCI state of a PDSCH reception for a PUR occasion may be QCLed with an SSB index used for a QCL relation for the PDCCH reception based on a delay between the PDSCH reception and a PDCCH reception for a PUR response for the PUR occasion.

The UE may perform one or more first measurements of one or more downlink beams in a first set of one or more periodic SSB indexes, the UE may perform one or more second measurements of one or more downlink beams in a second set of one or more candidate beams for recovery, and the method may further include determining a beam failure based on the one or more first measurements, and determining a beam for recovery based on the one or more second measurements. Performing the BFR procedure may include transmitting a contention free beam recovery request, and providing the UE a CORESET through a link to a search space set for monitoring a PDCCH in the CORESET. The search space set may be configured in a connected state. The search space set may be configured in the inactive state by a PUR response message. The search space set may be configured in the inactive state by an SIB message.

Performing the BFR procedure may include transmitting a contention free beam recovery request, and monitoring, by the UE, a PDCCH on a CORESET linked to an SSB index corresponding to a physical random access channel (PRACH) transmitted by the UE. Performing the BFR procedure may include transmitting a contention free beam recovery request, and providing the UE a configuration for a PRACH transmission. The configuration may be provided in a connected state. The configuration may be provided in the inactive state by a PUR response message. The configuration may be provided in the inactive state by an SIB message. Performing the BFR procedure may include transmitting a contention-based beam recovery request, and the contention-based beam recovery request may be based on a preamble and a random access channel (RACH) occasion QCLed with a selected candidate beam direction. The method may further include performing an uplink transmission from the UE in the inactive state, and the downlink transmission may include an acknowledgment for the uplink transmission. The uplink transmission may include a preconfigured uplink resources (PUR) transmission. The UE may perform a transition to a connected state, and the UE may indicate the transition may be based on detecting the beam failure.

A device may include a transceiver configured to access a communication network, and a device controller configured to control the transceiver to detect a beam failure based on a downlink transmission in an inactive state, and perform a beam failure recovery procedure based on detecting the beam failure. The downlink transmission may include a reference signal. The device controller may be configured to send an uplink transmission in the inactive state, and the downlink transmission may include an acknowledgment for the uplink transmission.

A method for beam failure recovery in a communication network may include detecting, at a first transmit-receive point (TRP), a performance condition in an uplink beam shared by a first user equipment (UE) in an inactive state and a second UE in an inactive state, sending a downlink transmission from the first TRP to the first UE based on detecting the performance condition, and performing, at the first UE, a transition procedure from the first TRP to a second TRP based on the downlink transmission. The transition procedure may include performing a beam management procedure with the second TRP. The beam management procedure may include selecting a candidate beam with the second TRP. The downlink transmission may include a preconfigured uplink resources (PUR) response message.

BRIEF DESCRIPTION OF THE DRAWINGS

The figures are not necessarily drawn to scale and elements of similar structures or functions are generally represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Figures 1A, 1B:
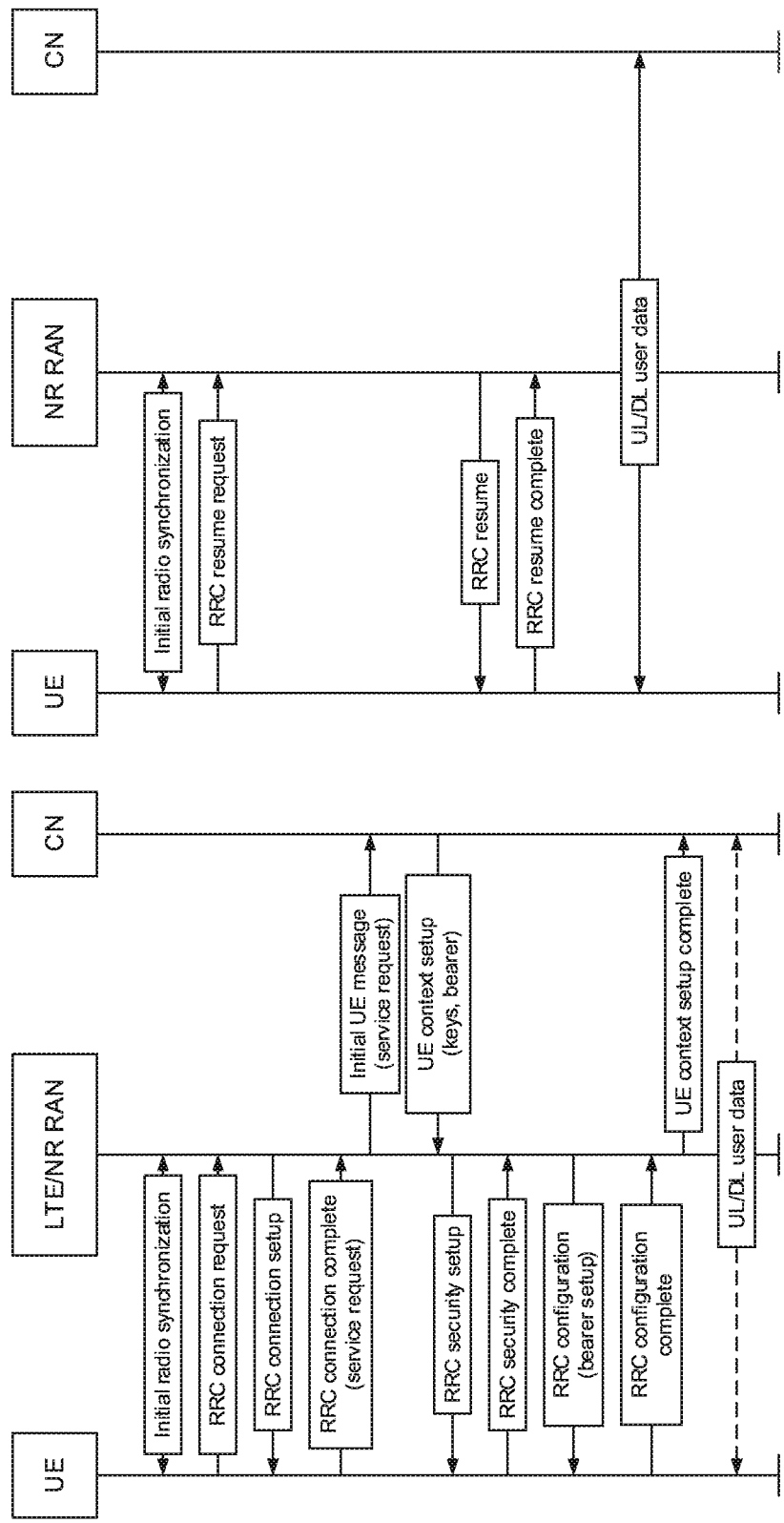
FIG. 1A illustrates an example embodiment of the signaling involved in a legacy (e.g., LTE) idle-to-connected transition.
FIG. 1B illustrates an example embodiment of the signaling involved in an NR inactive-to-connected transition in accordance with the disclosure.

This disclosure encompasses numerous inventive principles relating to beam failure detection and/or recovery by a UE in an inactive state. These principles may have independent utility and may be embodied individually, and not every embodiment may utilize every principle. Moreover, the principles may also be embodied in various combinations, some of which may amplify the benefits of the individual principles in a synergistic manner.

In some embodiments, a UE in accordance with the disclosure may detect a beam failure in an inactive state based on one or more downlink reference signals such as a synchronization signal block (SSB), a channel state information reference signal (CSI-RS), and/or the like. The UE may detect a beam failure by measuring one or more reference signals using a measurement configuration that may be made available to the UE through various mechanisms in accordance with the disclosure. For example, the UE may receive the measurement configuration with a response to a preconfigured uplink resources (PUR) message sent by the UE. As another example, the UE may receive the measurement configuration with a system information block (SIB) transmission that may be sent periodically and/or on demand by the UE. As a further example, the UE may be preconfigured with the measurement configuration, for example, in an PRO connected state.

To detect a beam failure in an inactive state, a UE in accordance with the disclosure may implement one or more beam switching and/or measurement techniques that may be adapted for operation in an inactive state (e.g., in a PUR framework). Some of these inactive state beam switching and/or measurement techniques in accordance with the disclosure relate to a UE obtaining a set of one or more SSB indexes. For example, the UE may be provided with a set of periodic SSB indexes, the UE may determine a set of periodic SSB indexes based on a reference signal (RS) used during an initial access procedure, and/or the UE may determine a set of SSB indexes based on spatial relation information for a PUP configuration.

Some inactive state beam switching and/or measurement techniques in accordance with the disclosure relate to activating a spatial relationship for a PUR response for a physical uplink shared channel (PUSCH) by the UE, for example when a gNodeB (gNB) determines a new spatial relation for the PUSCH. In some embodiments, the UE may make reference signal received power (RSRP) measurements of a physical downlink control channels (PDCCHs) that schedule the PDSCH carrying the PUP response, the gNB may determine the new spatial relationship based on the RSRP measurements, and a beam failure may be declared if all beams and/or SSB indexes fail.

Some inactive state beam switching and/or measurement techniques in accordance with the disclosure relate to determining a transmission control indicator (TCI) state for a current PDSCH reception. For example, if a time gap between a current physical downlink shared channel (PDSCH) reception and a PDCCH (which may be used for receiving a PUP acknowledgment and/or scheduling a PUR response) in the current PUP occasion is smaller than a threshold, the TCI state of the current PDSCH reception may be quasi-colocated (QCLed) with a default TCI state of the PDCCH. Otherwise, the TCI state of the current PDSCH reception may be QCLed with an SSB index used for a QCL relation of the current PDCCH reception.

Some inactive state beam switching and/or measurement techniques in accordance with the disclosure relate to detecting a beam failure and/or identifying a new beam based on measuring current and/or candidate beams. For example, a UE may continuously measure an RSRP and/or a reference signal received quality (RSRQ) of one or more downlink beams for a set of periodic SSB indexes (one of which may QCLed with corresponding spatial relation information of a PUSCH transmission. The UE may also measure the RSRP and/or RSRQ of one or more downlink beams for a set of candidate SSB indexes. The UE may detect a beam failure and/or select a new beam based on the measurements.

In some embodiments, a UE in accordance with the disclosure may implement one or more beam failure recovery techniques that may be adapted for operation in an inactive state. For example, for a contention free beam recovery request, the UE may be provided a configuration for a physical random access channel (PRACH) transmission, wherein the configuration may be provided in a connected state, Alternatively, the configuration may be provided in the inactive state by a PUR response message, and/or in the inactive state by an SIB message. In some alternative embodiments, the UE may use a contention-based 4-step random access channel (RACH) procedure for beam recovery. For example, the UE may send a recovery request using the preamble and RACH occasion QCLed with a selected candidate beam direction, e.g., the spatial relation information of the PUSCH.

In some embodiments, a UE in accordance with the disclosure may detect a beam failure in an inactive state without using a reference signal. For example, a UE may detect a beam failure if the UE does not receive one or more acknowledgments for one or more PUR messages sent by the UE. Upon detecting a beam failure, the UE may attempt to recover the beam, for example, using one or more candidate transmission configuration indicator (TCI) states. Additionally, or alternatively, the UE may transition to an RRC connected state to use beam failure recovery (BFR) procedures in the connected state, then return to the inactive state. The UE may indicate to a base station that the purpose of transitioning to the connected state is to perform a BFR.

In some embodiments, a network may initiate a beam reconfiguration of one or more UEs in an inactive state, for example, in response to detecting an overload and/or multi-user interference in an uplink beam shared by multiple UEs. For example, in response to detecting an overload or multi-user interference on a beam, a first transmit-receive point (TRP) may offload one of the UEs sharing the beam to a second TRP. The first TRP may send a downlink transmission (e.g., a PUR response message, an SIB message, and/or the like) to the UE that causes the UE to transition from the first TRP to a second TRP. The UE may perform a beam management procedure with the second TRP, for example, by selecting a candidate beam with the second TRP. The candidate beam may be selected, for example, based on an SSB configuration and a CSI-RS measurement configuration.

Example Embodiments

Some example embodiments of systems, apparatus, devices, processes, methods, and/or the like illustrating some possible implementation details according to the disclosure are described herein. These examples are provided for purposes of illustrating the principles of this disclosure, but the principles are not limited to or defined by these embodiments, implementation details, and/or the like. For example, some embodiments may be described in the context of 5G and/or New Radio (NR) wireless communication systems, but the principles may also be applied to any other types of communication systems including 3G, 4G and/or future generations of wireless networks, and/or any other communication systems.

UE Transmissions in Inactive State

In some embodiments of wireless communication systems, for example, Long Term Evolution (LTE) systems, a user equipment (UE) may only transmit in a radio resource control (RRC) CONNECTED state. Transitioning from an idle state to a connected state may involve a large amount of traffic between the UE, a radio access network (RAN), and/or a core network (CN), as well as a high latency. This traffic and latency may be required even if the UE has a small amount of data to transmit (e.g., one packet).

To reduce the traffic and/or latency involved in allowing a UE to transmit data, some embodiments of wireless communication systems, for example, NR systems, may implement an RRC_INACTIVE state that may reduce overhead and/or latency by not requiring reestablishment of the RRC connection setup. Instead, after initially establishing an RRC connection, the UE may transition to an RRC_INACTIVE state from which the UE may quickly transition back to the RRC_CONNECTED state to transmit data.

FIG. 1A illustrates an example embodiment of the signaling involved in a legacy (e.g., LTE) idle-to-connected transition. For comparison, FIG. 1B illustrates an example embodiment of the signaling involved in an NR inactive-to-connected transition in accordance with the disclosure. In FIGS. 1A and 1B, time is relative and time increases in a downwardly direction. As may be apparent from FIGS. 1A and 1B, an inactive-to-connected transition (FIG. 1B) may be faster and may involve less overhead signaling than a legacy idle-to-connected transition (FIG. 1A).

To further reduce overhead, latency, and/or power consumption (e.g., for Internet-of-Things (IoT) devices), some wireless communication systems may allow a UE to transmit small amounts of data while in an inactive state. For example, NR systems that implement Release 17 (Rel-17) Work Item on NR Small Data Transmissions in INACTIVE state by the 3rd Generation Partnership Project (3GPP) may allow small data transmissions (SDTs) by UEs while in the RRC_INACTIVE state without needing to transition to the RRC_CONNECTED state. The Work Item may include uplink SDTs for RACH-based schemes (e.g., 2-step and/or 4-step RACH) and transmission of UL data on pre-configured PUSCH resources (PUR) (e.g., reusing a configured grant Type 1) when a timing advance (TA) is valid.

Figure 2:
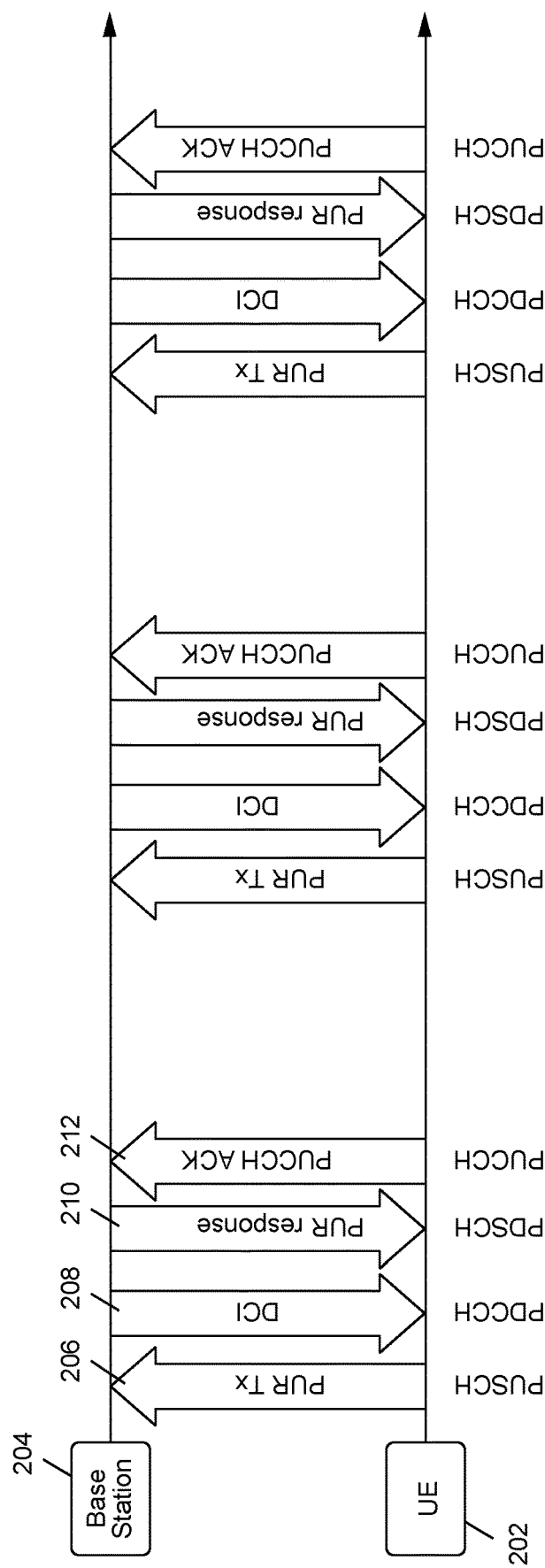
FIG. 2 illustrates an example embodiment of a configured grant small data transmission operation in an inactive state in accordance with the disclosure.

FIG. 2 illustrates an example embodiment of a configured grant small data transmission (CG SDT) operation in an inactive state in accordance with the disclosure. The embodiment illustrated in FIG. 2 may be implemented, for example, as an L2/L3 solution. In this embodiment, the terms CG SDT and PUR transmission may be used interchangeably.

The UE may initially be configured with a CG SDT configuration, for example, in an RRC suspend message. When a TA is valid, the UE 202 may perform a PUR transmit (PUR Tx) 206 to a base station 204 (e.g., a gNB, a transmit-receive point (TRP), and/or the like) using configured PUSCH resources.

Once the initial CG transmission 206 is performed, the UE 202 may monitor downlink control information (DCI) 208 (e.g., UE-specific DCI or common-DCI) for a potential PUR response reception 210 and possible subsequent data transmission and/or retransmission. The downlink transmission may be based, for example, on dynamic scheduling addressed to a UE-specific radio network temporary identifier (RNTI), and the uplink transmission may be based, for example, on a dynamic grant addressed to a UE-specific RNTI or configured grant.

The UE 202 may receive a PUR response message 210 which may include downlink data and possibly beam failure recovery (BFR) configuration information. The PUR response message 210 may also include reconfiguration information relating to the CG SDT. The UE may transmit an acknowledgment/no acknowledgment (ACK/NACK) 212, for example, on a physical uplink control channel (PUSCH). Additional CG SDT operations may be performed in the inactive state as illustrated in FIG. 2.

Messaging for Beam Refinement

Some wireless systems may implement one or more beam refinement techniques in accordance with the disclosure. In some embodiments, beam refinement may improve data transfer on a beam, for example, by narrowing a beam, selecting a beam having better directionality and/or higher gain, and/or the like.

Figure 3:
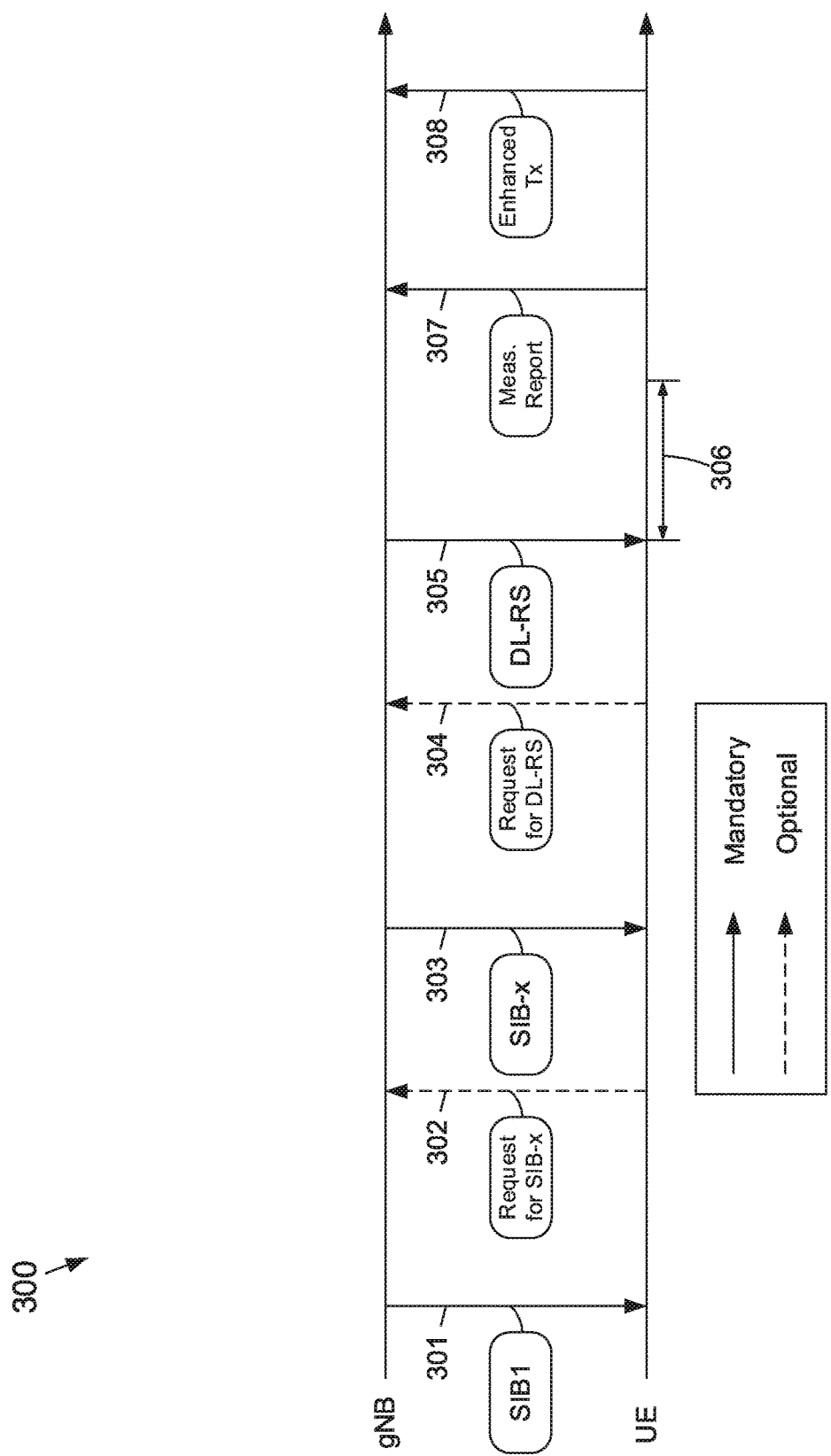
FIG. 3 illustrates an overview of an example messaging sequence for a beam refinement process for a UE in an RRC_INACTIVE state in accordance with the disclosure.

FIG. 3 illustrates an overview of an example messaging sequence for a beam refinement process 300 for a UE in an RRC_INACTIVE state in accordance with the disclosure. In FIG. 3, time advances toward the right. The process 300 allows UEs in an RRC_INACTIVE state to perform an uplink (UL) signal transmission and/or an enhanced downlink (DL) signal reception mechanism (which may be referred to as an enhanced Tx). In particular, the process 300 allows a UE to indicate to a gNB which analog narrowbeam is optimal and should be used when receiving the enhanced Tx and/or transmitting to the UE.

A UE obtains System Information (SI) at 301 by receiving a System Information Block 1 (SIB1) that includes information for receiving a subsequent SIB message (which may be referred to as SIB-x). The information received in the SIB1 may include an indication of resources used for transmitting an SIB-x (e.g., time/frequency) and an indication of resources used for requesting an SIB-x (e.g., when an SIB-x is transmitted on-demand to allow a UE in an RRC_INACTIVE state to request an SIB-x). An SIB-x may be transmitted periodically, semi-periodically, or on an on-demand basis in response to a request for an SIB-x. The contents of an SIB-x may include an indication of resources and configurations for subsequent DL RS transmission and information relating to the measurement report.

If the SIB-x is being transmitted periodically or semi-periodically, the UE attempts to receive an SIB-x at 303 either by monitoring for a periodically or semi-periodically transmitted SIB-x. If the SIB-x is transmitted on an on-demand basis, the UE sends a request for SIB-x at 302, and the UE attempts to receive an SIB-x at 302 in response to the on-demand request for an SIB-x that was sent by the UE at 302.

If DL-RS messages are being transmitted periodically or semi-periodically, the UE may receive a set of downlink reference signals (DL RS) in a DL RS message at 305. If the DL RS messages are being transmitted on an on-demand basis, the UE may send a request for DL RS message at 304, in which case the UE may receive a set of downlink reference signals (DL RS) in a DL RS message at 305 in response to the on-demand request for the DL RS message. The UE may omit sending a request for SIB-x and directly request a set of DL RS signals if the UE has previously acquired an SIB-x. The downlink reference signals may be used for performing a beam measurement. A DL RS message may include an indication representing a collection of RS sets in which each set corresponds to a particular beam that the UE may measure and indicate to the gNB as a suitable beam for reception. For example, a DL RS message may include an indication of the resources (time/frequency) and the type of reference signals for the DL RS signals that are to be used.

At 306, the UE performs beam measurement using the DL-RS signals indicated in the DL RS message received at 305. A time duration between different RS sets may be specified to account for suitable measurement times. At 307, the UE sends a measurement report to the gNB based on the measurements performed at 306. The content of the measurement report and the resources used for sending the measurement report may be indicated in the SIB-x received at 303, in a dedicated UL grant, or in a combination of the SIB-x and a dedicated UL grant.

An enhanced TX may be performed at 308. A predetermined time delay between the transmission of the measurement report at 307 and the Enhanced Tx at 308 may be defined to allow the gNB to accordingly adjust the reception beam based on the measurement report.

Beam refinement for a reduced capacity (Redcap) UE in an RRC_INACTIVE state may use a new SIB (which may be referred to as SIB-x) for beam-refinement measurement and report configuration in accordance with the disclosure. Additionally, a new e Message 2 (E msg2) may be used for allocating measurement report resources. The e Message 2 is an evolved message that has more functionalities than a legacy message 2 (msg2). Further, a DL RS for beam refinement may be requested by a UE, and a UE beam report may be sent from a UE that is in an RRC_INACTIVE state.

Figure 4:
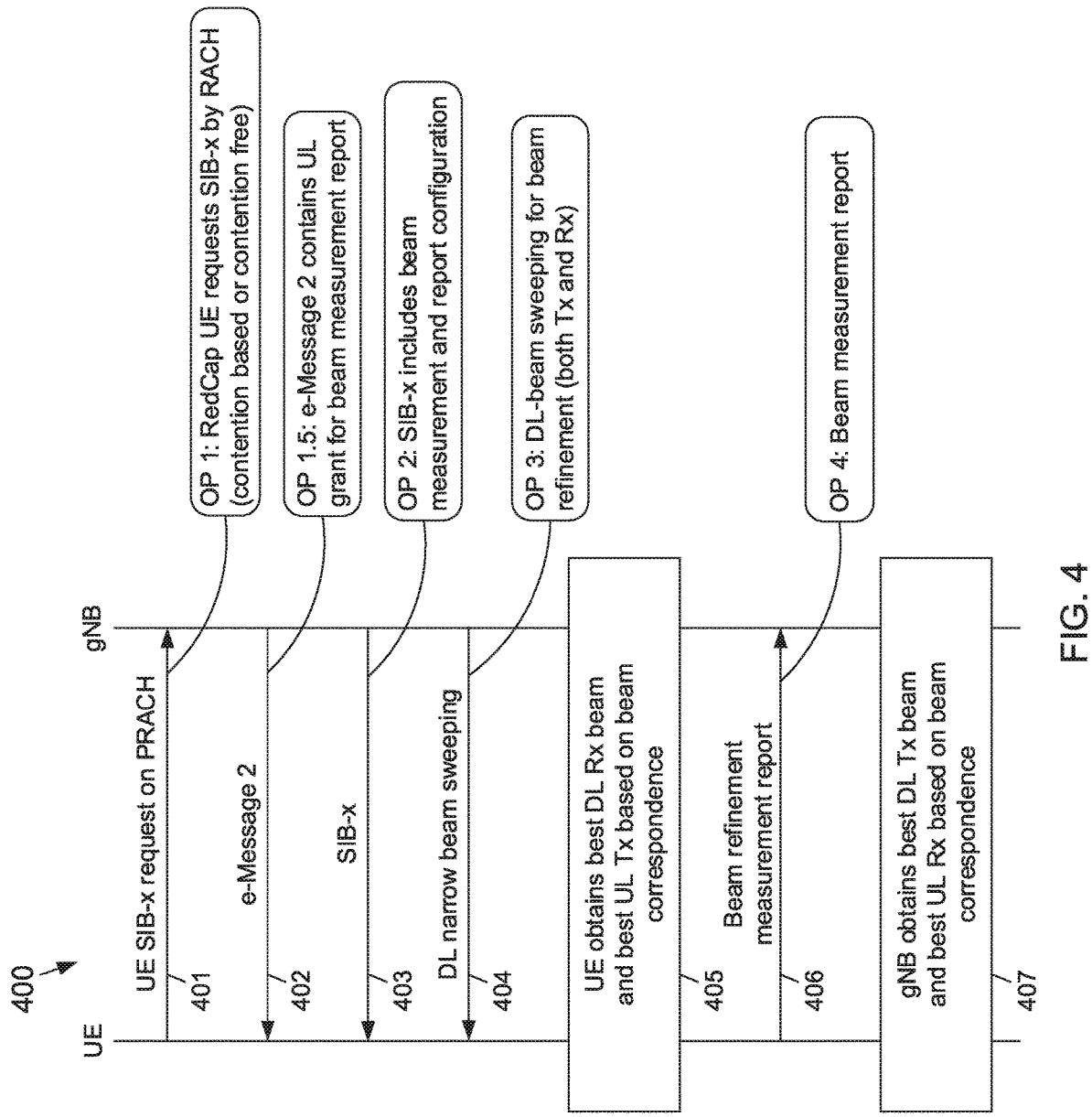
FIG. 4 illustrates another example messaging sequence for a beam refinement process for a UE in an RRC_INACTIVE state in accordance with the disclosure.

FIG. 4 illustrates another example messaging sequence for a beam refinement process 400 for a UE in an RRC_INACTIVE state in accordance with the disclosure. Time advances in a downwardly direction. The beam refinement process 400 may be a contention-based or a contention-free process.

Operational Phase 1 (OP 1). UE Request for SIB-x Information.

Variation 1.1. Contention-Based Process

In a contention-based process, a UE in an inactive state may request an on-demand SIB-x at 401 by selecting a random access preamble and/or a physical random access channel (PRACH) occasion, The selected PRACH occasion may correspond to an SSB index having the measured strongest broad beam that was broadcast earlier. The request by the UE may occur periodically or may be event-driven based on, for example, a UL buffer status for UL transmission of the UE, a DL paging of the UE for a DL reception, or a measured RSRP and/or RSRQ of a current DL beam that is less than a threshold (due to beam blockage or intra- or inter-beam interference, Upon successful reception of the request at a gNB, the gNB sends at 402 an e Message 2/RAR (extRA ResponseWindow) message to the UE confirming reception of the request at 401. The e Message 2 differs from an SIB1 message, which is a broadcast message from a gNB to all UEs, by being a message that a gNB sends to a group of UEs that share the same RA RNTI instead of being a message that is sent to all UEs. In response to the e Message 2, the UE then sends a request for r message in an e Message 3. The e Message 3 is a PUSCH transmission from a UE to a gNB. In contrast to the e Message 3, the request sent at 401 is a transmission of a preamble sequence combined with a PRACH occasion from a UE to a gNB. The gNB acknowledges (ACK) the SIB-x request in a message 4 (not shown). At 403, the gNB transmits the SIB-x message to UE.

Variation 1.2. Contention free Process

In a contention-free process, a UE in an inactive state that has been preconfigured with a PRACH resource to send an SIB-x request sends an SIB-x request at 401. The PRACH resource may be in a form of random access preamble, a PRACH occasion that may be SIB-x specific, and/or a RedCap UE-specific PRACH resource. The UE requests a new on-demand SIB-x by transmitting the pre-configured PRACH resource to the gNB. The gNB acknowledges (ACK) the request at 402 in an e Message 2 and knows that the request for an SIB-x is from the particular UE that sent the request. Triggering conditions for a UE request at 401 may be the same as for a contention-based process, Sending of an SIB X request and an acknowledgement are not performed in a contention-free process. At 403, the gNB transmits the SIB-x message to UE.

Operational Phase 1.5 (OP 1.5)

For both a contention-based and a contention-free process, the resources used for a beam report may be optionally allocated in the e Message 2. Each RedCap UE that sent a request for SIB-x in a different PRACH resource from other RedCap UEs is allocated a resource that is orthogonal from other allocated resources. In one example embodiment, resource allocation in e Message 2 may be on-demand, e.g., when a UE sends a request for SIB-x for random access at 401. Alternatively, resource allocation in an e Message 2 may be periodically broadcast to UEs independently of an e Message 1 (which uses a different PRACH resource pool from a normal message 1 (msg1)) and may include a resource grant for a measurement report based on the network remembering a specific earlier-sent request for SIB-x that each UE sent in the past. It may be highly likely that a RedCap UE is stationary, so the set of Redcap UEs per cell may not change and it may be relatively easy for the network to remember the RACH resource that each UE used. Besides resource allocation in an e Message 2, resources used for a beam report may also be optionally allocated in a normal message 2 for a legacy RACH procedure when UE changes from an inactive state to a connected state. That is, an e Message 2 differs from a normal message 2 by additionally being able to include allocation of resources for beam refinement and reporting.

Operation Phase 2 (OP 2): Broadcasting SIB-x.

A new SIB-x is broadcast at 403 within the coverage area of the broad beam indicated by a requested UE (i.e., the SSB index corresponding to the strongest broad beam). The gNB does not perform contention resolution for UEs using the same preamble and PRACH occasion because the broadcast SIB is for every contending UE. An SIB-x includes a beam measurement and report configuration. Contents of an SIB-x are described below. The SIB-x is broadcast a predefined number of times (i.e., Aperiodical), or for a predetermined number of times based on the PRACH resource selected by the requesting UE (i.e., Aperioclical). Alternatively, the SIB-x may be broadcast periodically and semi-persistently until a UE explicitly requests to end the broadcast, e.g., when a UE has no data to transmit in the buffer or when a UE has already done a good beam alignment with the gNB in the past in the sense that the measured DL RSRP is greater than a threshold.

Operational Phase 3 (OP 3): Broadcasting DL RS.

Downlink reference signals (DL RSs) for beam refinement may be broadcast on-demand. Upon a gNB receiving an SIB-x request from a UE, the gNB may perform narrow beam sweeping at 404 by broadcasting a DL SSB or a DL CSI-RS in various narrow beams within the broad beam indicated by the requesting UE. The narrow beam sweeping uses the configuration indicated in the SIB-x. The DL RS may be broadcast periodically continuously (suitable for periodic traffic); for a pre-defined number of times over a time window; for a variable number of times over a time window depending on the PRACH resource selected by the UE requesting the SIB-x; for a variable number of times over a time window depending on the specific SIB-x request in the e Message 3 in operational phase 1; depending on the accumulated number of UE SIB-x requests within a time window; or broadcast periodically until a UE requests to end the broadcasts.

Operational Phase 4 (OP 4): Measurement Report.

At 405, a UE performs a UL beam measurement and reports the results to the gNB at 406 using the measurement configuration indicated in the SIB-x. The resources used for reporting may be allocated in operational phase 2 for UEs that used a different RACH resource for a Message 1 by orthogonal resources being allocated, or by being allocated in an SIB-x in which a set of resources are allocated and contended by all the UEs intending to report a beam measurement. The measurement report may include the C-RNTI of the UEs. At 407, the gNB obtains the best DL Tx beam and best UL Rx beam based on the report.

Variation 4.1. On-Demand Beam Measurement Report

For an on-demand beam-measurement report, a UE may report the beam measurement based on some events, e.g., when UE has UL data to transmit in the buffer, when the UE is paged by the network because the UE has DL data to receive, when a beam failure is detected by having a measured RSRP and/or RSRQ that is less than a threshold for a predefined number of times, or based on an explicit command from the network via a DL DCI or an RRC message.

Variation 4.2. Periodical Beam Measurement Report

A UE may report a beam measurement periodically when the UE has been periodically configured by the network. In one embodiment, a UE reports a beam measurement periodically until the UE enters an RRC IDLE state.

Beam Failure Recovery

In some embodiments, at higher frequencies (e.g., above 6 GHz) control and/or data transmission may be more sensitive to the relatively narrow beam width of an analog beam, In contrast to an out-of-coverage event, a beam failure may be a relatively short-term and/or dynamic event. Thus, it may be beneficial to maintain one or more channels (e.g., at least a DL control channel) for a connection in response to a beam failure event. Thus, some embodiments of wireless communication systems (e.g., NR systems) in accordance with the disclosure may support dynamic beam failure reporting and/or beam failure recovery procedures.

An overview of a legacy beam failure recovery process for a UE in a connected state in accordance with the disclosure may operate as follows. Beam failure monitoring may be based on one or more reference signals such as a periodic CSI-RS or an SSB which may be configured, for example, by RRC. A detection metric may be implemented as a number (N) of consecutive PDCCH hypothetical block error rates (BLERs) exceeding a threshold to determine that a beam failure has occurred. A beam failure recovery request may be implemented, for example, with a contention-free UE-specific PRACH channel (e.g., resources and/or preambles). In some embodiments, each resource and/or preamble may be mapped to one new beam identification RS.

A more detailed example embodiment of legacy NR beam failure detection and recovery procedures for a UE in a connected state in accordance with the disclosure may operate as follows. Some embodiments may use terminology that may be similar to that used in the following documents which are incorporated by reference: 3GPP TS 38.211 v15.6.0, "NR; Physical channels and modulation;" 3GPP TS 38.212 v15.6.0, "NR; Multiplexing and Channel coding;" 3GPP TS 38.213 v15,6.0, "NR, Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

In a beam failure detection procedure, a UE may be provided with a set $\bar{q}_0$ of periodic CSI-RS resource configuration indexes, for example, by failureDetectionResources. The UE may assess the radio link quality according to the set $\bar{q}_0$ of resource configurations against the threshold $Q_{out,LR}$. The physical (PHY) layer may inform one or more higher layers when the radio link quality is worse than the threshold $Q_{out,LR}$ with a specified periodicity.

For each beam failure indication from the lower PHY layer, a beamFailureDetectionTimer may be started or restarted, and a BFI_COUNTER may be incremented by 1 Before the beamFailureDetectionTimer expires, if BFI_COUNTER>=beamFailureInstanceMaxCount (which may be referred to as $C_{MAX}$), the UE may initiate a random access procedure on the primary cell of a master or secondary cell group (SpCell) or BFR on the secondary cell (SCell).

Figure 5:
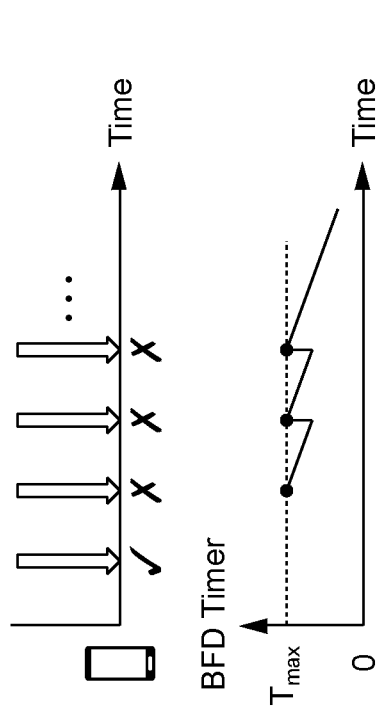
FIG. 5 illustrates an example embodiment of a beam failure procedure in which a beam failure is not detected in accordance with the disclosure.
Figure 5:
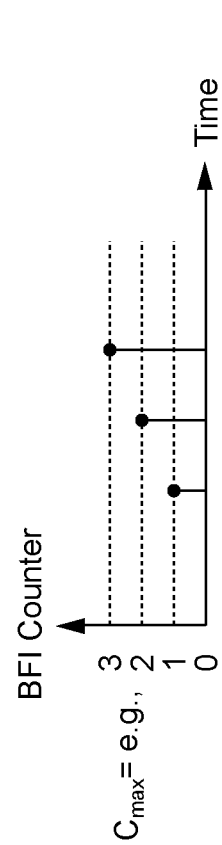

FIG. 5 illustrates an example embodiment of a beam failure procedure in which BFI_COUNTER<$C_{MAX}$ when the BFD counter expires in accordance with the disclosure.

Figure 6:
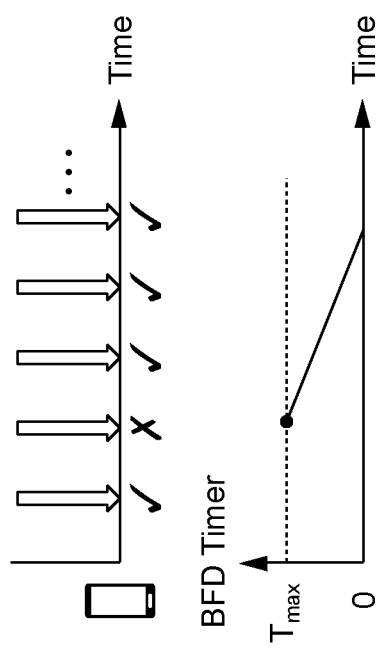
FIG. 6 illustrates an example embodiment of a beam failure procedure in which a beam failure is detected in accordance with the disclosure.
Figure 6:
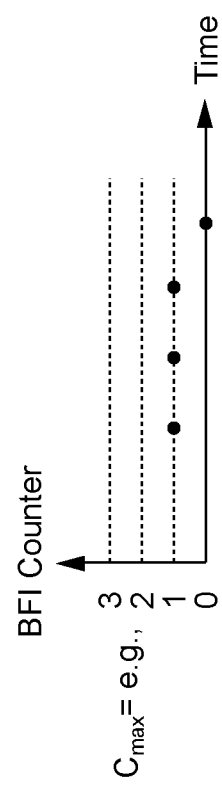

FIG. 6 illustrates an example embodiment of a beam failure procedure in which BFI_COUNTER>=$C_{MAX}$ when the BFD counter expires in accordance with the disclosure.

To search for the next beam, for the PCell or the PSCell, upon request from one or more higher layers, the UE may provide the one or more higher layers the periodic CSI-RS configuration indexes and/or synchronization signal and/or physical broadcast channel (SS/PBCH) indexes form the set $\bar{q}_1$ and the corresponding L1-RSRP measurements that are greater than or equal to the $Q_{out,LR}$ threshold.

A random access procedure related to beam failure recovery may select a beam and the associated RA resource for preamble transmission. For random access response (RAR) reception, if a specific DCI is received within the RAR window, beam recovery may be considered complete. Otherwise, the random access procedure may be considered as not completed, and the RA resource selection procedure may be performed after a back-off time. If the RACH procedure for beam recovery is not completed after a certain number of trials, the RACH procedure may be ended.

In the legacy embodiments described above, the UE may not perform beam failure and/or recovery in an inactive state. Moreover, the BER framework in an RRC_CONNECTED state as described above may not be simply reused in an inactive state because, for example, it may be intended for downlink operation using downlink reference signals to respond to downlink beam failure rather than uplink beam failure. Moreover, the BFR framework requires the UE to be in an RRC connected state.

Beam Failure Detection and Recovery in Inactive State

Figure 7:
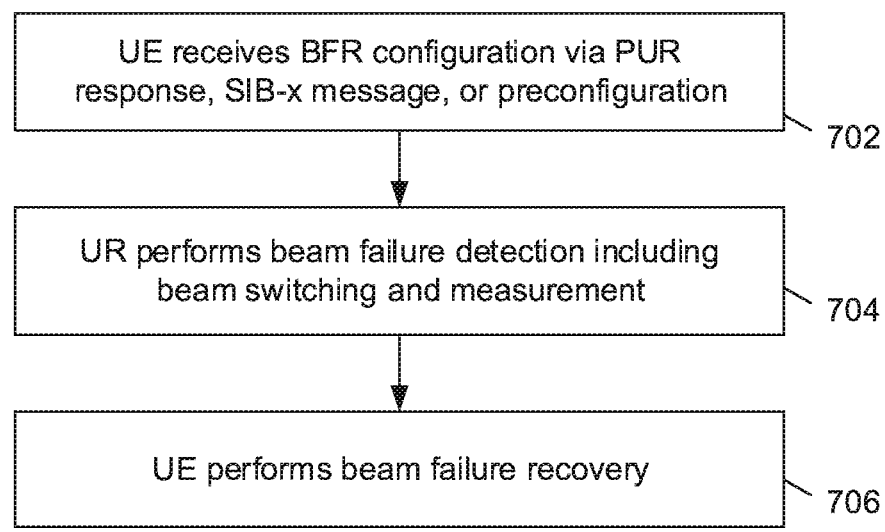
FIG. 7 illustrates an example embodiment of a beam failure detection and recovery method for a UE in an inactive state in accordance with the disclosure.

FIG. 7 illustrates an example embodiment of a beam failure detection and recovery method for a UE in an inactive state in accordance with the disclosure. In contrast to a legacy BFR procedure, in the embodiment illustrated in FIG. 7, a UE in an inactive state may detect a beam failure and initiate a beam failure recovery procedure at the UE.

At operation 702, the UE may receive a BFR configuration for performing beam failure detection and recovery at the UE. The UE may receive the BFR configuration, for example, in a response to a PUR message, in an SIB-x message, by being preconfigured while in an RRC_CONNECTED state, or in any other manner. At operation 704, the UE may perform a beam failure detection procedure, for example, by switching beams based on the BFR configuration and measuring the resulting beams to determine if a beam failure has occurred. If a beam failure is detected at operation 704, the method may proceed to operation 706 where the UE may perform a beam failure recovery procedure, for example, by selecting a candidate beam based on the BFR configuration.

Some more detailed example embodiments of BFR methods in accordance with the disclosure are provided below. For purposes of illustration, these examples include numerous implementations details. However, the principles are not limited to these or any other specific implementation details. In the embodiments described below, some variables used in a BFR procedure in an inactive state may be adapted from other variables by including "PUR" in the variable name.

Embodiment 0: UE Initiated Beam Failure Recovery with SSB Measurement in RRC_INACTIVE State Operation 0.1

In some embodiments, a UE in an RRC_INACTIVE state may be provided with a UE-specific SSB measurement configuration in a PUR response message (which may be scheduled by a DCI sent through a PUR search space) for beam failure recovery. Alternatively, in a manner similar to that described above in the context of beam refinement, an SIB-x may broadcast a common SSB measurement configuration for beam failure recovery to all RRC_INACTIVE UEs. As another alternative, a UE may be preconfigured with SSB measurement configurations when the UE is in an RRC Connected state.

In some embodiments, a UE may be provided, for each BWP of a camping cell, a set $\bar{q}_0$ of periodic SSB indexes by failureDetectionResources_PUR or beamFailureDetectionResourceList_PUR and a set $\bar{q}_1$ of periodic SSB indexes by candidateBeamRSList_PUR or candidateBeamResourceList_PUR for radio link quality measurements on the BWP of the camping cell. If the UE is not provided $\bar{q}_0$ the UE may determine the set $\bar{q}_0$ to include one or more periodic SSB indexes with the same values as the RS indexes that the UE uses for decoding message 2 in an initial access procedure. Alternatively, the UE may determine the set $\bar{q}_0$ to include the SSB index which is the spatial relation information of the PUR configuration.

Operation 0.2

In some embodiments, when $\bar{q}_0$=(SSB-Index-1, SSB-index-2 . . . SSB-index-j . . . SSB-index-K), PUP PUSCH may only have one active spatial relation information which may be QCLed (e.g., directly) with one of the SSB indexes SSB-index-j which may also be QCLed with the PDCCH and PDSCH of the PUP response message to the UE. The spatial relation information of PUSCH QCLed with SSB-Index-1, SSB-Index-2, . . . SSB-Index-K may be RRC pre-configured and may be activated, via a MAC CE in a PDSCH transmission to the UE, for example, when the gNB determines new spatial relation information of the PUSCH for the UE.

The UE may monitor (in some embodiments, it may continuously monitor) the PDCCH (e.g., CORESET #0) which schedules the PDSCH carrying the PUR response message corresponding to all of the SSB-index-1, SSB-index-2, . . . SSB-index-j . . . SSB-index-K. The UE may perform RSRP measurements and report the measurements to the gNB, for example, in a PUR PUSCH.

Then gNB may determine a new spatial relation of PUSCH by selecting the best SSB-index (e.g., the SSB-index with the strongest measured RSRP) and activate it via a MAC CE In PDSCH. Then the PDCCH and PDSCH of the PUR response message may also be updated to a new TCI state QCLed with the new SSB-Index. Beam failure may be declared, for example, if all the K beams or SSB-indexes fail.

In some embodiments, independent of the beam failure recovery procedure, if the time gap between the current PDSCH reception and the PDCCH (used for receiving an acknowledgment (e.g., an ACK/NACK and/or scheduling the PUR response including activating a new TCI state)) in the current PUR occasion is less than a threshold, the TCI state of current PDSCH reception may be QCLed with a default TCI state of the PDCCH (which may not necessarily be QCLed with the current PDCCH reception). One example of a default TCI state of the PDCCH may be that of a CORESET corresponding to the smallest SSB index among the CORESETs a UE may have monitored in the latest slot. Another example of a default TCI state of the PDCCH may be the SSB index QCLed with the PUR. Otherwise, if the time gap is greater than or equal to the threshold, the TCI state of the current PDSCH reception may be QCLed with the SSB index used for the QCL relation of the current PDCCH reception.

Operation 0.3

In some embodiments, the UE may continuously measure the RSRP and/or the RSRQ of the current DL beam of the SSB, e.g., the set $\bar{q}_0$ of periodic SSB indexes, one of which may be QCLed with the corresponding spatial relation information of the PUSCH transmission. The physical layer in the UE may assess the radio link quality according to the set $\bar{q}_0$ of resource configurations against the threshold $Q_{out,LR}$. In the meantime, the UE may begin measuring the set of SSB in the candidate beams configured in the UE-specific SSB measurement configuration. The UE may identify a candidate beam for recovery. For example, the UE may apply the $I_{in,LR}$ threshold to the L1-RSRP measurement obtained for a SSB resource from the set $\bar{q}_1$. Alternatively, the UE may apply the $Q_{in,LR}$ threshold to the L1-RSRP measurement obtained for an SSB resource from all SSBs that are not in $\bar{q}_0$ as $\bar{q}_1$.

Operation 0.4

In some embodiments, the UE may declare a beam failure based on a number of consecutive beam-failure instances exceeding a configured value, where, for example, one beam-failure instance may be determined as the measured L1-RSRP and/or RSRQ being below a configured threshold $Q_{out,LR}$ rlmInSyncOutOfSyncThreshold_PUR. For example, in non-discontinuous reception (non-DRX) mode operation, the physical layer in the UE may provide an indication to one or more higher layers when the radio link quality for all corresponding resource configurations in the set $\bar{q}_0$ that the UE uses to assess the radio link quality is worse than the threshold $Q_{out,LR}$. For example, the physical layer may inform one or more higher layers when the radio link quality is worse than the threshold $Q_{out,LR}$ with a periodicity determined by the maximum between the shortest periodicity among the periodic SSBs on the PCell in the set $\bar{q}_0$ that the UE may use to assess the radio link quality, and a fixed time period (e.g., 2 msec). In DRX mode operation, the physical layer may provide an indication to one or more higher layers when the radio link quality is worse than the threshold $Q_{out,LR}$ with a predetermined periodicity (for example, a periodicity as described in TS 38.133).

If a beam failure instance indication is received by the MAC layer, the MAC layer may perform the following operations:

(1) start or restart the beamFailureDetectionTimer;
(2) increment the BFLCOUNTER by 1;
(3) If BFLCOUNTER>=beamFailureInstanceMaxCount, initiate a Random Access procedure on the Pcell or BFR on the Scell;
(4) If the beamFailureDetectionTimer expires or the Random Access procedure is successfully completed, reset the BFI_COUNTER to 0, stop the beamFailureRecoveryTimer, and consider the beam failure recovery procedure to be completed.

Operation 0.5

In some embodiments, when a beam failure is declared, upon request from one or more higher layers, the UE may provide to the one or more higher layers the periodic SSB indexes from the set $\bar{q}_1$ and the corresponding L1-RSRP measurements that are larger than or equal to the $Q_{in,LR}$ threshold.

Operation 0.6

In some embodiments, for a contention free beam recovery request, a UE may be provided a CORESET through a link to a search space set provided by recoverySearchSpaceId_PUR for monitoring PDCCH in the CORESET. The recoverySearchSpaceId_PUR may be pre-configured when UE is in RRC_Connected State. Alternatively, the recoverySearchSpaceId_PUR may be configured in RRC_Inactive state through the PUR response message. Alternatively, recoverySearchSpaceId_PUR may be configured in RRC_Inactive state through the SIB-x, for example, in a manner similar to that described above in the context of beam refinement. Alternatively, a UE may monitor PDCCH on CORESET0 linked to an SSB index corresponding to the PRACH transmitted by the UE.

Operation 0.7

In some embodiments, for a contention free beam recovery request, the UE may select a new beam at the MAC layer. For example, the UE may send a recovery request using the preamble and RACH occasion QCLed with the selected candidate beam direction to the TRP. The UE may be provided, for example, by PRACH-ResourceDedicatedBFR_PUR, a configuration for a PRACH transmission, where the ResourceDedicatedBFR_PUR may be pre-configured when the UE is in an RRC_Connected state or in an RRC_INACTIVE state via a PUR response message, or via an SIB-x message for example, in a manner similar to that described above in the context of beam refinement. For a PRACH transmission in slot n and according to antenna port quasi-colocation parameters associated with a periodic SSB with index $q_{new}$ provided by one or more higher layers, the UE may monitor one or more PDCCH in a search space set provided by recoverySearchSpaceId_PUR for detection of a DCI format with CRC scrambled by C-RNTI or MCS-C-RNTI starting from slot n+4 within a window configured by BeamFailureRecoveryConfig_PUR. BeamFailureRecoveryConfig_PUR may be pre-configured when the UE is in an RRC_Connected state or configured when UE is in an RRC_INACTIVE state via a PUR response message. For PDCCH monitoring in a search space set provided by recoverySearchSpaceId-PUR and for a corresponding PDSCH reception, the UE may assume the same antenna port quasi-collocation parameters as the ones associated with index $q_{new}$ until the UE receives, from one or more higher layers, an activation for a TCI state or any of the parameters tci-StatesPDCCH-ToAddList and/or tci-StatesPDCCH-ToReleaseList Operation 0.8

In some embodiments, for a contention free beam recovery request, if the DCI is detected in the search space set recoverySearchSpaceId-PUR, a random access procedure may be successfully completed. The UE may transmit the PUSCH QCLed with the selected SSB index $q_{new}$. If ra-ResponseWindow configured in BeamFailureRecoveryConfig_PUR expires, and the DCI has not been received, the UE may perform the following operations:
(1) the Random Access Response reception may be considered not successful;
(2) increment PREAMBLE_TRANSMISSION_ COUNTER by 1;
(3) if PREAMBLE_TRANSMISSION_COUNTER=preambleTransMax+1 (where preambleTransMax is configured in BeamFaifureRecoveryConfig_PUR), the UE may:
(a) declare an RA error and report the error to one or more higher layers.
Otherwise, the UE may:
(b)(1) consider the random access procedure to not be complete, and begin a back-off procedure; and
(b)(2) perform a random access resource selection procedure after back-off.

Operation 0.9

In some embodiments, for a contention-based 4-step RACH procedure, the UE may select a new beam at the MAC layer. The UE may send a recovery request using the preamble and RACH occasion that was QCLed with the selected candidate beam direction, e.g., the spatial relation information of the PUSCH to the TRP. The UE may then perform a procedure such as that illustrated in Appendix 1.

Embodiment 1: UE Initiated Beam Failure Recovery, with CSI-RS Measurement in RRC_INACTIVE State Operation 1.1

In some embodiments, based on the NR PUR framework in the background, a UE in an RRC_INACTIVE state may obtain a UE-specific CSI-RS measurement configuration in a PUR response message (e.g., scheduled by DCI sent over a PUR search space) for beam refinement and beam failure recovery. Alternatively, in a manner similar to that described above in the context of beam refinement, an SIB-x may broadcast a common CSI-RS measurement configuration for beam failure recovery to all RRC_INACTIVE UEs. Alternatively, a UE may also be preconfigured with RS measurement configurations when UE is in an RRC_Connected state.

In some embodiments, a UE may be provided, for each BWP of a camping cell, a set $\bar{q}_0$ of periodic CSI-RS resource configuration indexes by failureDetectionResources_PUR or beamFailureDetectionResourceList_PUR and a set $\bar{q}_1$ of periodic CSI-RS resource configuration indexes and/or SS/PBCH block indexes by candidateBeamRSList_PLR or candidateBeamResourceList_PUR for radio link quality measurements on the BWP of the camping cell. If the UE is not provided $\bar{q}_0$, the UE may determine the set $\bar{q}_0$ to include periodic CSI-RS resource configuration indexes with the same values as the RS indexes in the RS sets indicated by TCI-State for respective CORESETs that the UE may use for monitoring PDCCH over the PUR search space. The TCI-State for respective CORESETs that the UE uses for monitoring PDCCH over PUR search space may be preconfigured when the UE is in an RRC_Connected state.

Operation 1.2

In some embodiments, when $\bar{q}_0$=(CSI-RS-Index-1, CSI-RS-index-2, . . . CSI-RS-index-j, . . . CSI-RS-Index-K), it may be assumed that PUR PUSCH may only have one active spatial relation information which is QCLed (e.g., directly QCLed) with one of the CSI-RS-indexes, e.g., CSI-RS-index-j which may also be QCLed with the PDCCH and PDSCH of the PUR response message to the UE. The spatial relation information of PUSCH QCLed with CSI-RS-Index-1, CSI-RS-Index-2 . . . CSI-RS-Index-K may be RRC pre-configured and may be activated via a MAC CE in a PDSCH transmission to UE, e.g., when gNB determines the new spatial relation information of the PUSCH for the UE.

For the set $\bar{q}_0$, the UE may assess the radio link quality only according to periodic CSI-RS resource configurations that may be quasi-colocated with the DM-RS of PDCCH receptions monitored by the UE which schedules the PDSCH carrying the PUR response message. Thus, the network may configure additional CORESETs to increase the TCI states the UE may assess in a $\bar{q}_0$ set. The UE may perform RSRP measurements of CSI-RS indexes and report the measurements to gNB in a PUR PUSCH.

The gNB may determine a new spatial relation of PUSCH by selecting the best CSI-RS-index (e.g., the CSI-RS-index with the strongest measured RSRP) and activate it via a MAC CE in a PDSCH. The PDCCH and PDSCH of the PUR response message may also be updated to a new TCI state QCLed with the new CSI-RS-Index. Beam failure is declared, for example, if all the K beams or CSI-RS-indexes fail.

In some embodiments, independent of a beam failure recovery procedure, if the time gap between the current PDSCH reception and the PDCCH (used for receiving an ACK/NACK and/or scheduling a PUR response including activating a new TCI state) in the current PUR occasion is less than a threshold, the TCI state of current PDSCH reception may be QCLed with a default TCI state of a PDCCH (which may not necessarily be QCLed with the current PDCCH reception). One example of a default TCI state of PDCCH may be that of a CORESET which may have the TCI state QCLed with the smallest CSI-RS index among a CORESETs a UE may have monitored in the latest slot, Alternatively, a default TCI state of a PDCCH may be the TCI state of a CORESET with the smallest index. Another example of a default TCI state of a PDCCH may be the CSI-RS index QCLed with the PUR. Otherwise, if the time gap is greater than or equal to the threshold, the TCI state of the current PDSCH reception may be QCLed with the CSI-RS index used for the QOL relation of the current PDCCH reception.

Operation 1.3

In some embodiments, a UE may measure (e.g., may continuously measure) the RSRP and/or RSRQ of the current DL beam of the CSI-RS, e.g., the set $\bar{q}_0$ of periodic CSI-RS resource configuration indexes, one of which may be QCLed with the corresponding spatial relation information of the PUSCH transmission. The physical layer in the UE may assess the radio link quality according to the set $\bar{q}_0$ of resource configurations against the threshold $Q_{out,LR}$. For the set $\bar{q}_0$, the UE may assess the radio link quality only according to periodic CSI-RS resource configurations on the PCell or the PSCell that may be quasi-colocated with the PUSCH transmissions by the UE.

Operation 1.4

In some embodiments, in the meantime, the UE may begin measuring the set of CSI-RS in the candidate beams configured in the UE-specific CSI-RS measurement configuration. The UE may identify a candidate beam for recovery. For example, the UE may apply the $Q_{in,LR}$ threshold to the L1-RSRP measurement obtained for a CSI-RS resource from the set $\bar{q}_1$ after scaling a respective CSI-RS reception power with a value provided by powerControlOffsetSS. Upon request from one or more higher layers, the UE may provide to the one or more higher layers the periodic CSI-RS configuration indexes from the set $\bar{q}_1$ and the corresponding L1-RSRP measurements that may be greater than or equal to the $Q_{in,LR}$ threshold.

Operation 1.5

In some embodiments, the UE may declare a beam failure based on a number of consecutive beam-failure instances exceeding a configured value, where one beam-failure instance may be defined as the measured L1-RSRP and/or RSRQ being below a configured threshold $Q_{out,LR}$ rlmInSyncOutOfSyncThreshold_PUR. For example, in non-DRX mode operation, the physical layer in the UE may provide an indication to one or more higher layers when the radio link quality for all corresponding resource configurations in the set $\bar{q}_0$ that the UE uses to assess the radio link quality worse than the threshold $Q_{out,LR}$. The physical layer may inform the one or more higher layers when the radio link quality is worse than the threshold $Q_{out,LR}$ with a periodicity determined by the maximum of the shortest periodicity among the periodic CSI-RS configurations on the PCell or the PSCell in the set $\bar{q}_0$ that the UE uses to assess the radio link quality, and a fixed time (e.g., 2 msec). In DRX mode operation, the physical layer may provide an indication to one or more higher layers when the radio link quality is worse than the threshold $Q_{out,LR}$ with a predetermined (for example, a periodicity as described in TS 38.133).

If a beam failure instance indication is received by the MAC layer, the MAC layer may perform the following operations:
(1) start or restart the beamFailureDetectionTimer;
(2) increment BFI_COUNTER by 1;
(3) If BFI_COUNTER>=beamFailureInstanceMaxCount, initiate a Random Access procedure on the Pcell or BFR procedure on the Scell;
(4) If the beamFailureDetectionTimer expires or Random Access procedure is successfully completed, reset BFI_COUNTER to 0 ,stop the beamFailureRecoveryTimer, and consider the beam failure recovery procedure to be completed.

Operation 1.6

In some embodiments, a UE may be provided a CORESET through a link to a search space set provided by recoverySearchSpaceId_PUR for monitoring PDCCH in the CORESET. The recoverySearchSpaceId_PUR may be pre-configured when the UE is in RRC_Connected State. Or the recoverySearchSpaceId_PUR may be configured in an RRC_Inactive state through the PUR response message. Or the recoverySearchSpaceId_PUR may be configured in an RRC_Inactive state through an SIB-x message in a manner similar to that described above in the context of beam refinement.

Operation 1.7

In some embodiments, a UE may select a new beam at a MAC layer. The UE may make a beam failure recovery request using an option 1 contention free 2-step contention free random access. For example, the UE may send a recovery request using the preamble and RACH occasion QCLed with the selected candidate beam direction to the transmit-receive point (TRP). For example, the UE may be provided by PRACH-ResourceDedicatedBFR_PUR, a configuration for PRACH transmission, where the ResourceDedicatedBFR_PUR may be pre-configured when the UE is in an RRC_Connected state or in an RRC_I-NACTIVE state via a PUR response message or via an SIB-x message in a manner similar to that described above in the context of beam refinement. For a PRACH transmission in slot n and according to antenna port quasi-colocation parameters associated with periodic CSI-RS resource configuration with index $q_{new}$ provided by one or more higher layers, the UE may monitor PDCCH in a search space set provided by recoverySearchSpaceId_PUR for detection of a DCI format with a CRC scrambled by C-RNTI or MCS-C--RNTI starting from slot n+4 within a window configured by BeamFailureRecoveryConfig_PUR. BeamFailureRecoveryConfig_PUR can be pre-configured when UE is in an RRC_Connected state or configured when UE is in an RRC_INACTIVE state via a PUR response message. For PDCCH monitoring in a search space set provided by recoverySearchSpaceId-PUR and for a corresponding PDSCH reception, the UE may assume the same antenna port quasi-collocation parameters as the ones associated with index $q_{new}$ until the UE receives, by one or more higher layers, an activation for a TCI state or any of the parameters tci-StatesPDCCH-ToAddList and/or tci-StatesPDCCH-ToReleaseList.

Operation 1.8

In some embodiments, if the DCI is detected in the search space set recoverySearchSpaceId-PUR, a Random Access procedure may be considered successfully completed. The UE may transmit the PUSCH QCLed with the selected CSI-RS-index $q_{new}$. If the ra-ResponseWindow configured in BeamFailureRecoveryConfig_PUR expires and the DCI is not received, the UE may perform the following operations:
(1) the Random Access Response reception may be considered not successful;
(2) increment PREAMBLE_TRANSMISSION_ COUNTER by 1;
(3) if PREAMBLE_TRANSMISSION_COUNTER=preambleTransMax+1 (where preambleTransMax is configured in BeamFailureRecoveryConfig_PUR), the UE may:
(a) declare an RA error and report the error to one or more higher layers.
Otherwise, the UE may:
(b)(1) consider the random access procedure to not be complete, and begin a back-off procedure; and
(b)(2) perform a random access resource selection procedure after back-off.
Operation 1.9
In some embodiments, the UE may select a new beam at the MAC layer. The UE may make a beam failure recovery request using an option 2 contention-based 4-step RACH procedure. For example, the UE may send a recovery request using the preamble and RACH occasion QCLed with the selected candidate beam direction, e.g., the spatial relation information of the PUSCH to the TRP. The UE may then perform a procedure such as that illustrated in Appendix 2.

Embodiment 2: UE Initiated Beam Failure Recovery, Without Beam RS Measurement in RRC_INACTIVE State, Approach 1

Operation 2.1
In some embodiments, as part of an initial configuration of an NR PUR transmission, when a UE is in an RRC_Connected state, the UE may be pre-configured with one TCI state for a PUSCH transmission and/or PDCCH reception in an NR PUR search space and a set of candidate TCI states for beam failure recovery (e.g., fast beam failure recovery) in an RRC_INACTIVE state. The candidate TCI states may be obtained based on a legacy NR beam management procedure where the set of candidate SSB broad beams with the strongest measured RSRP or RSRQ values may be selected and stored.
Operation 2.2
In some embodiments, a UE may perform a PUR transmission in an RRC_INACTIVE state periodically to a gNB. If the UE does not receive an ACK/NACK in the PDCCH over the PUR search space (e.g., in a consecutive M PUR occasions), the UE may declare a beam failure at the MAC layer. For example, the physical layer in the UE may provide an indication to one or more higher layers when the UE does not receive an ACK/NACK from the gNB within a specified time window in a PUR occasion. At the MAC layer, if a beam failure instance indication is received by the MAC layer, the MAC layer may perform the following operations:
(1) start or restart beamFailureDetectionTimer;
(2) Increase BFI_COUNTER by 1;
(3) If BFI_COUNTER>=beamFailureInstanceMaxCount, initiate a Random Access procedure on the Pcell or BFR on the Scell:
(4) If the beamFailureDetectionTimer expires or the Random Access procedure is successfully completed, reset BFI_COUNTER to 0, stop the beamFailureRecoveryTimer, and consider the beam failure recovery procedure to be completed.

Operation 2.3
In some embodiments, a UE may be provided a CORESET through a link to a search space set provided by recoverySearchSpaceId_PUR for monitoring PDCCH in the CORESET. The recoverySearchSpaceId_PUR may be pre-configured when the UE is in an RRC_Connected State. Or the recoverySearchSpaceId_PUR may be configured in an RRC_Inactive state through the PUR response message. Or the recoverySearchSpaceId_PUR may be configured in an RRC_Inactive state through an SIB-x message in a manner similar to that described above in the context of beam refinement.
Operation 2.4
In some embodiments, a UE at a MAC layer may select a candidate TCI state from a pre-configured list of candidate TCI states stored in the UE. The UE may make a beam failure recovery request using a contention free 2-step contention free random access. For example, the UE may send a recovery request using the preamble and RACH occasion QCLed with the selected candidate beam spatial filter information to the TRP. For example, the UE may be provided, by PRACH-ResourceDedicatedBFR_PUR, a configuration for a PRACH transmission, where the ResourceDedicatedBFR_PUR may be pre-configured when the UE is in an RRC_Connected state or in an RRC_INACTIVE state via PUR response message. For a PRACH transmission in slot n and according to antenna port quasi-colocation parameters associated with the new selected TCI state provided by one or more higher layers, the UE may monitor the PDCCH in a search space set provided by recoverySearchSpaceId_PUR for detection of a DCI format with CRC scrambled by C-RNTI or MCS-C-RNTI starting from slot n+4 within a window configured by BeamFailureRecoveryConfig_PUR. BeamFailureRecoveryConfig_PUR may be pre-configured when the UE is in an RRC-Connected state or configured when the UE is in an RRC_INACTIVE state via a PUR response message. For PDCCH monitoring in a search space set provided by recoverySearchSpaceId-PUR and for corresponding PDSCH reception, the UE may assume the same antenna port quasi-collocation parameters as the new selected TCI state until the UE receives, by one or more higher layers, an activation for a TCI state.
Operation 2.5
In some embodiments, if the DCI is detected in the search space set recoverySearchSpaceId-PUR the Random Access procedure may be considered successfully completed. The UE may transmit the PUSCH QCLed with the previous PDCCH reception of DCI. If ra-ResponseWindow configured in BeamFailureRecoveryConfig_PUR expires and the DCI is not received, the UE may perform the following operations:
(1) consider the Random Access Response reception to be not successful;
(2) increment PREAMBLE_TRANSMISSION_ COUNTER by 1;
(3) if PREAMBLE_TRANSMISSION_COUNTER=preambleTransMax+1 (preambleTransMax is configured in BeamFailureRecoveryConfig_PUR), the UE may perform the following operations:
(a) If (there are still pre-configured new TCI states left stored at the UE):
(i) the UE may go back to Operation 2.4 to select the next candidate beam with a new TCI state and continue the 2-step contention free RACH process;

otherwise:

(ii) Either the UE declares RA error and report to higher layer; or (iii) the UE falls back to RACH and moves to an RRC_Connected state for legacy beam recovery procedure; or (iv) the UE falls back to the beam y procedures of embodiment 1;

otherwise:

(b1) the Random Access procedure is considered not complete, and the UE begins a back-off procedure; and (b2) the UE performs the Random Access Resource selection procedure after the back-off.

Embodiment 3: UE Initiated Beam Failure Recovery, Without Beam RS Measurement in RRC_INACTIVE State, Approach 2

Operation 3.1

In some embodiments, the UE may perform a PUR transmission in an RRC_INACTIVE state periodically to a gNB. If the UE does not receive an ACK/NACK in the PDCCH over the PUR search space in M consecutive PUR occasions, the UE may declare a beam failure at the MAC layer. For example, the physical layer in the UE may provide an indication to one or more higher layers when the UE does not receive an ACK/NACK from gNB within a time window in a PUR occasion. At the MAC layer, if a beam failure instance indication is received by the MAC layer, the MAC layer may perform the following operations:

(1) start or restart beamFailureDetectionTimer;

(2) Increase BFI_COUNTER by 1;

(3) if BFI_COUNTER>=beamFailureInstanceMaxCount, initiate a Random Access procedure on the Pcell or BFR on the Scell;

(4) if the beamFailureDetectionTimer expires or the Random Access procedure is successfully completed, reset BFI_COUNTER to 0, stop the beamFailureRecoveryTimer, and consider the beam failure recovery procedure to be completed.

Operation 3.2

In some embodiments, once the UE declares a beam failure, it may perform RACH procedure and transition to an RRC_Connected state to perform a beam refinement procedure as described above. In a RACH procedure, the UE may select specific preamble resources to indicate to the network that the purpose of the "beam recovery in the RRC_Connected state" is that the UE was unable to successfully perform a beam failure recovery procedure in the inactive state. Alternatively, the UE can also indicate the purpose of the "beam recovery in RRC_Connected state" to the network in message 3 of a RACH procedure.

Operation 3.3

In some embodiments, once the UE is in an RRC_Connected state, UE may be RRC configured with an RS measurement configuration for selecting a candidate beam for beam refinement. The UE may select the candidate beam and complete a legacy beam refinement procedure with the network. Once the beam refinement is completed, the UE may transition back to an RRC_INACTIVE state and perform an NR PUR transmission with the new beam.

Embodiment 4: Network (NW) Initiated Beam Reconfiguration, for Load Balancing and/or Interference Management, Approach 1

Operation 4.1

In some embodiments, a TRP may detect overloading or multi-user interference in the current UL beam shared by multiple PUR UEs. The TRP may offload one or more of the UEs to another TRP, for example, for load balancing and/or interference mitigation.

Operation 4.2

In some embodiments, the TRP may configure a selected one of the UEs in the PUR response message or SIB-x message to perform beam management steps with another TRP by using an SSB configuration and a new or old UE-specific or common CSI-RS measurement configuration. The UE may identify a candidate beam (e.g., a narrow beam) to another TRP for offloading and/or interference management. For example, the UE may perform the P1, P2 and P3 operation of NR Rel-15 beam management steps to select a new beam (e.g., for a new TRP). For example, the UE may first perform SSB measurements and select the best SSB index with the strongest RSRP value. Then, it may inform the network of the new selected SSB index and the spatial relation information of the PUSCH associated with this SSB index, for example, via a contention-free 2-step RACH or a contention-based 4-step RACH. Then, the UE may perform a beam refinement based on the configured CSI-RS indexes and select the best CSI-RS index which gives the strongest measured RSRP value.

Operation 4.3

In some embodiments, the UE may be provided a CORESET through a link to a search space set provided by ReconfigSearchSpaceId_PUR for monitoring PDCCH in the CORESET. The ReconfigSearchSpaceId_PUR may be preconfigured when the UE is in an RRC_Connected State. Or the ReconfigSearchSpaceId_PUR may be configured in an RRC_Inactive state through the PUR response message. Or the ReconfigSearchSpaceId_PUR may be configured in an RRC_Inactive state through the SIB-x message in a manner similar to that described above in the context of beam refinement.

Operation 4.4

In some embodiments, the UE may make a beam reconfiguration request using a contention free 2-step contention free random access. For example, the UE may send a reconfiguration request using the preamble and RACH occasion QCLed with the selected candidate beam direction or selected CSI-RS index to another TRP.

Operation 4.5

In some embodiments, another TRP may respond to the UE by transmitting a response message via a PDCCH in a PUR search space QCLed with the RS associated with the selected candidate beam included in the request.

Embodiment 5: Network Initiated Beam Reconfiguration, for Load Balancing and/or Interference Management, Approach 2

Operation 5.1

In some embodiments, a TRP may detect overloading or multi-user interference in the current UL beam shared by multiple PUR UEs. The TRP may offload one or more of the UEs to another TRP, for example, for load balancing and/or interference mitigation.

Operation 5.2

In some embodiments, the TRP may trigger a selected one of the UEs in an RRC-INACTIVE state in the DCI in the PUR framework to re-configure another candidate beam for the PUR. The UE may then perform a beam management procedure using the preconfigured SSB configuration and UE-specific CSI-RS measurement configuration. The UE may identify a candidate beam (e.g., a narrow beam) to another TRP for offloading and/or interference management. For example, the UE may first perform SSB measurements and select the best SSB index with the strongest RSRP value. Then, the UE may inform the network of the new selected SSB index and the spatial relation information of the PUSCH associated with this SSB index via a contention-free 2-step RACH or a contention-based 4-step RACH. Then, the UE may perform a beam refinement procedure based on the configured CSI-RS indexes and select the best CSI-RS index which gives the strongest measured RSRP value.

Operation 5.3

In some embodiments, the UE may make a beam reconfiguration request using a contention free 2-step contention free random access. For example, the UE may send a reconfiguration request using the preamble and RACH occasion QCLed with the selected candidate beam direction or selected CSI-RS index to the other TRP.

Operation 5.4

In some embodiments, the other TRP may respond to the UE by transmitting the response message via a PDCCH in a PUR search space QCLed with the RS associated with the selected candidate beam included in the request.

Embodiment 6: Network Initiated Beam
Reconfiguration, for Load Balancing and/or
Interference Management, Approach 3

Operation 6.1

In some embodiments, a TRP may detect overloading or multi-user interference in the current UL beam shared by multiple PUR UEs. The TRP may offload one or more of the UEs to another TRP, for example, for load balancing and/or interference mitigation.

Operation 6.2

In some embodiments, the TRP may reconfigure a selected one of the UEs in an RRC_INACTIVE state in the DCI or PUR response message in the PUR framework with another candidate beam selected by the network or a new TCI state selected by the network for PUR for offloading and/or interference management.

Operation 6.3

In some embodiments, the UE may send a confirmation to the TRP via a MAC CE or an RRC message.

Additional Fallback Procedures

In some embodiments, as one alternative for a fallback due to a beam failure, the UE may measure the downlink CRS RS over the PDSCH of the PUR response message. The UE may detect a beam failure if the RSRP value is below a threshold for a consecutive number of PUR response messages. The UE may request a beam recovery by another pre-configured candidate beam from an gNB via a two-step contention free request. If a beam failure still occurs (e.g., via a UE downlink measurement), the UE may transition to a RACH mode.

In some embodiments, as another alternative for a fallback due to a beam failure, if there is no PDSCH transmission (e.g., only PDCCH), and if the UE does not receive an ACK/NACK from a gNB within a specified time window, the UE may assume a beam failure and reconfigure an alternative UL beam for UL beam recovery and request to gNB via a two-step contention free procedure. If the gNB detected a UL beam failure, the gNB may respond by confirming the alternative beam in a DCI over the alternative beam. Otherwise, the gNB may reject the recovery request from the UE and re-configure one or more other parameters (e.g., Tx power) in a DCI over the alternative beam. The UE may then continue use the original beam with the new configured parameters. If a beam failure still occurs, the UE may fall back to a RACH mode autonomously.

User Equipment

Figure 8:
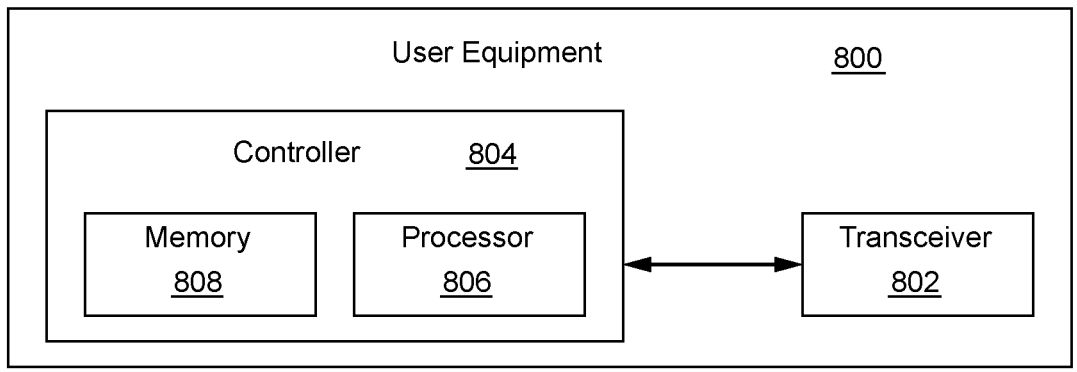
FIG. 8 illustrates an example embodiment of a user equipment in accordance with the disclosure.

FIG. 8 illustrates an example embodiment of a user equipment (UE) in accordance with the disclosure. The embodiment 800 illustrated in FIG. 8 may include a radio transceiver 802 and a controller 804 which may control the operation of the transceiver 802 and/or any other components in the UE 800. The UE 800 may be used, for example, to implement any of the functionality described in this disclosure. The transceiver 802 may transmit/receive one or more signals to/from a base station, and may include an interface unit for such transmissions/receptions. The controller 804 may include, for example, one or more processors 806 and a memory 808 which may store instructions for the one or more processors 806 to execute code to implement any of the functionality described in this disclosure. For example, the UE 800 and/or the controller 804 may be used to implement functionality relating to a UE performing a beam failure detection and/or recovery procedure in an inactive state.

Base Station

Figure 9:
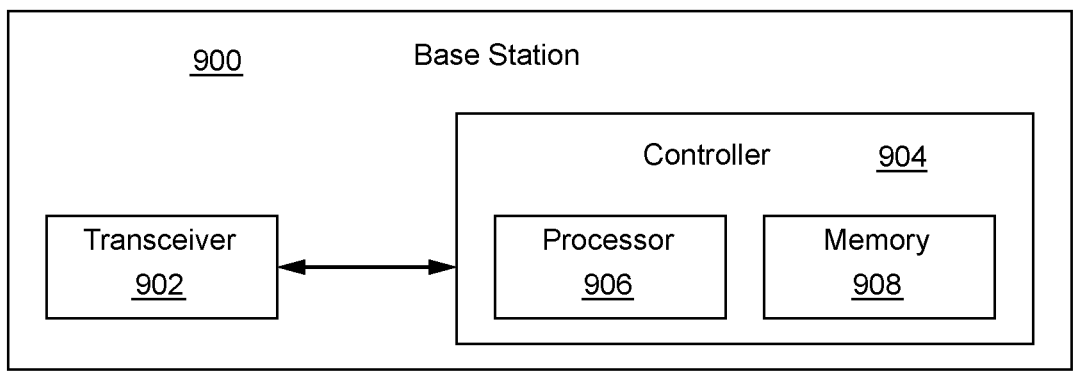
FIG. 9 illustrates an example embodiment of a base station in accordance with the disclosure.

FIG. 9 illustrates an example embodiment of a base station in accordance with the disclosure. The embodiment 900 illustrated in FIG. 9 may include a radio transceiver 902 and a controller 904 which may control the operation of the transceiver 902 and/or any other components in the base station 900. The base station 900 may be used, for example, to implement any of the functionality described in this disclosure. The transceiver 902 may transmit/receive one or more signals to/from a user equipment, and may include an interface unit for such transmissions/receptions. The controller 904 may include, for example, one or more processors 906 and a memory 908 which may store instructions for the one or more processors 906 to execute code to implement any of the base station functionality described in this disclosure. For example, the base station 900 and/or the controller 904 may be used to implement functionality relating to network initiated beam reconfiguration for load balancing and/or interference management, and/or the like.

In the embodiments illustrated in FIGS. 8 and 9, the transceivers 802 and 902 may be implemented with various components to receive and/or transmit RF signals such as amplifiers, filters, modulators and/or demodulators, A/D and/or DA converters, antennas, switches, phase shifters, detectors, couplers, conductors, transmission lines, and/or the like. The controllers 804 and 904 may be implemented with hardware, software, and/or any combination thereof. For example, full or partial hardware implementations may include combinational logic, sequential logic, timers, counters, registers, gate arrays, amplifiers, synthesizers, multiplexers, modulators, demodulators, filters, vector processors, complex programmable logic devices (CPLDs), field programmable gate arrays (FPGAs), application specific integrated circuits (ASICs), systems on chip (SOC), state machines, data converters such as ADCs and DACs, and/or the like. Full or partial software implementations may include one or more processor cores, memories, program and/or data storage, and/or the like, which may be located locally and/or remotely, and which may be programmed to execute instructions to perform one or more functions of the controllers. Some embodiments may include one or more CPUs such as complex instruction set computer (CISC) processors such as x86 processors and/or reduced instruction set computer (RISC) processors such as ARM processors, and/or the like, executing instructions stored in any type of memory.

Additional Embodiments

Figure 10:
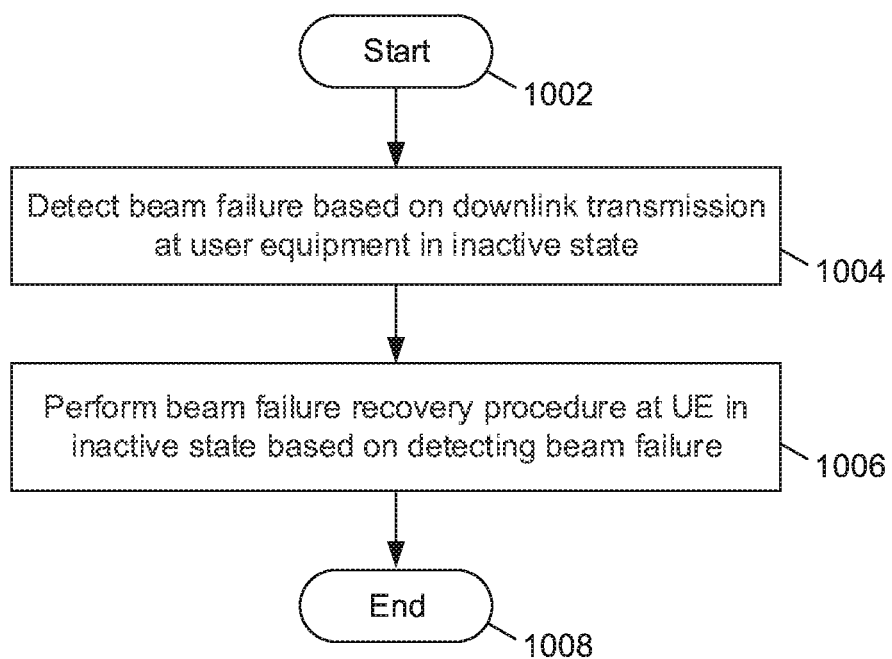
FIG. 10 illustrates an embodiment of a method for beam failure recovery in a communication network in accordance with the disclosure.

FIG. 10 illustrates an embodiment of a method for beam failure recovery in a communication network in accordance with the disclosure. The method may begin at operation 1002. At operation 1004, the method may detect a beam failure based on a downlink transmission at a user equipment (UE) in an inactive state. At operation 1006, the method may perform a beam failure recovery (BFR) procedure at the UE in the inactive state based on detecting the beam failure. The method may end at operation 1008.

Figure 11:
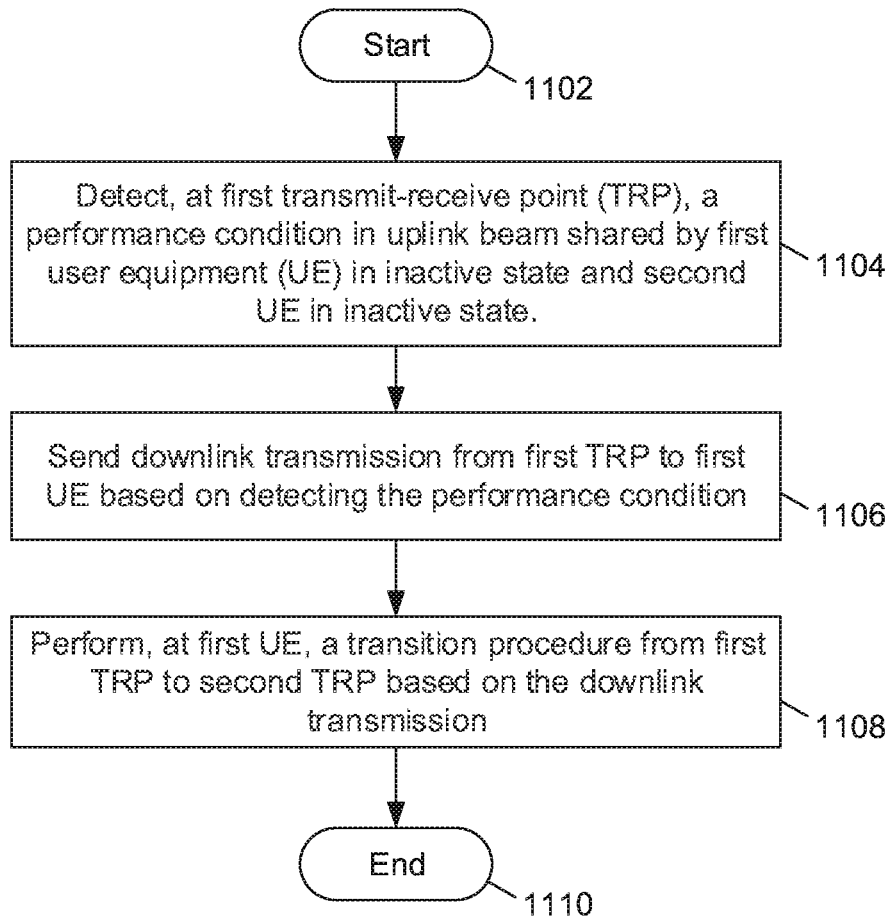
FIG. 11 illustrates another embodiment of a method for beam failure recovery in a communication network in accordance with the disclosure.

FIG. 11 illustrates an embodiment of a method for beam failure recovery in a communication network in accordance with the disclosure. The method may begin at operation 1102. At operation 1104, the method may detect, at a first transmit-receive point (TRP), a performance condition in an uplink beam shared by a first user equipment (UE) in an inactive state and a second UE in an inactive state. At operation 1106, the method may send a downlink transmission from the first TRP to the first UE based on detecting the performance condition. At operation 1108, the method may perform, at the first UE, a transition procedure from the first TRP to a second TRP based on the downlink transmission. The method may end at operation 1110.

In the embodiments illustrated in FIGS. 10-11, as well as the other embodiments illustrated herein, the illustrated components and/or operations are exemplary only. Some embodiments may involve various additional components and/or operations not illustrated, and some embodiments may omit some components and/or operations. Moreover, in some embodiments, the arrangement of components and/or temporal order of the operations may be varied. Although some components may be illustrated as individual components, in some embodiments, some components shown separately may be integrated into single components, and/or some components shown as single components may be implemented with multiple components.

The embodiments disclosed herein may be described in the context of various implementation details, but the principles of this disclosure are not limited to these or any other specific details. Some functionality has been described as being implemented by certain components, but in other embodiments, the functionality may be distributed between different systems and components in different locations. A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Moreover, the various details and embodiments described above may be combined to produce additional embodiments according to the inventive principles of this patent disclosure. Various organizational aids such as section headings and the like may be provided as a convenience, but the subject matter arranged according to these aids and the principles of this disclosure are not defined or limited by these organizational aids.

Since the inventive principles of this patent disclosure may be modified in arrangement and detail without departing from the inventive concepts, such changes and modifications are considered to fall within the scope of the following claims.

The invention claimed is:

1. A method for beam failure recovery in a communication network, the method comprising:
receiving a downlink transmission at a user equipment (UE) in an inactive state;
detecting a beam failure based on the downlink transmission at the UE while in the inactive state; and
performing a beam failure recovery (BFR) procedure at the UE in the inactive state based on detecting the beam failure.

2. The method of claim 1, wherein:
the downlink transmission comprises a reference signal; and
detecting the beam failure comprises measuring the reference signal.

3. The method of claim 2, wherein the reference signal comprises a synchronization signal block.

4. The method of claim 2, wherein the reference signal comprises a channel state information reference signal.

5. The method of claim 1, wherein detecting the beam failure comprises detecting the beam failure based on a beam failure measurement configuration.

6. The method of claim 5, further comprising receiving the beam failure measurement configuration at the UE.

7. The method of claim 5, wherein the UE receives the beam failure measurement configuration based on a preconfigured uplink resources (PUR) response.

8. The method of claim 5, wherein the UE receives the beam failure measurement configuration based on a system information block (SIB) transmission.

9. The method of claim 5, wherein the UE is preconfigured with at least a portion of the beam failure measurement configuration in a connected state.

10. The method of claim 5, wherein detecting the beam failure comprises:
switching one or more beams based on the beam failure measurement configuration; and
measuring the one or more beams based on the beam failure measurement configuration.

11. The method of claim 1, wherein:
the method further comprises performing an uplink transmission from the UE in the inactive state;
the downlink transmission comprises an acknowledgment transmission for the uplink transmission; and
detecting the beam failure comprises measuring the acknowledgment transmission.

12. The method of claim 11, wherein the uplink transmission comprises a preconfigured uplink resources (PUR) transmission.

13. The method of claim 11, wherein:
the UE performs a transition to a connected state; and
the UE indicates the transition is based on detecting the beam failure.

14. The method of claim 1, wherein performing the BFR procedure comprises:

transmitting a contention free beam recovery request; and
providing the UE a configuration for a physical random access channel (PRACH) transmission.

15. The method of claim 1, wherein a first transmission control indicator (TCI) state of a physical downlink shared channel (PDSCH) reception for a preconfigured uplink resources (PUR) occasion is quasi-colocated (QCLed) with a synchronization signal block (SSB) index used for a QCL relation for a physical downlink control channel (PDCCH) reception.

16. The method of claim 15, wherein the first TCI state is QCLed with the SSB index based on a delay between the PDSCH reception and a PDCCH reception for a PUR response for the PUR occasion.

17. A device comprising:
a transceiver configured to access a communication network; and
a device controller configured to control the transceiver to:
receive a downlink transmission at the device in an inactive state;
detect a beam failure based on the downlink transmission while in the inactive state; and
perform a beam failure recovery procedure based on detecting the beam failure.

* * * * *